(12) United States Patent
Lou et al.

(10) Patent No.: US 7,508,736 B2
(45) Date of Patent: Mar. 24, 2009

(54) VECTOR MIGRATION OF 1ST ORDER FREE-SURFACE RELATED DOWNGOING MULTIPLES FROM VSP DATA

(75) Inventors: Min Lou, Houston, TX (US); Xiaomin Zhao, Sugar Land, TX (US); Francis D. Doherty, Sugar Land, TX (US); James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/684,378

(22) Filed: Mar. 9, 2007

(65) Prior Publication Data
US 2008/0221796 A1 Sep. 11, 2008

(51) Int. Cl.
*G01V 1/28* (2006.01)
(52) U.S. Cl. .......................... 367/57; 367/50
(58) Field of Classification Search ............. 367/27, 367/50, 57; 181/106; 702/18, 14
See application file for complete search history.

(56) References Cited

U.S. PATENT DOCUMENTS

| | | | |
|---|---|---|---|
| 4,837,517 A | 6/1989 | Barber | |
| 4,847,813 A * | 7/1989 | Alam et al. | 367/57 |
| 4,918,670 A * | 4/1990 | Wang | 367/38 |
| 5,097,452 A * | 3/1992 | Beasley | 367/53 |
| 5,157,605 A | 10/1992 | Chandler et al. | |
| 5,345,179 A | 9/1994 | Habashy et al. | |
| 5,367,262 A | 11/1994 | Manning | |
| 5,452,761 A | 9/1995 | Beard et al. | |
| 5,587,965 A * | 12/1996 | Dragoset et al. | 367/24 |
| 5,596,548 A * | 1/1997 | Krebs | 367/56 |
| 5,742,560 A * | 4/1998 | Krebs | 367/57 |
| 5,811,873 A | 9/1998 | Soejima | |
| 5,884,227 A | 3/1999 | Rabinovich et al. | |
| 6,092,024 A | 7/2000 | Wu | |
| 6,601,671 B1 * | 8/2003 | Zhao et al. | 181/108 |
| 6,778,907 B1 * | 8/2004 | Washbourne et al. | 702/6 |
| 6,819,628 B2 * | 11/2004 | Tal-Ezer | 367/51 |
| 6,868,038 B2 * | 3/2005 | Leaney | 367/57 |
| 6,892,137 B2 | 5/2005 | Haugland | |
| 7,031,839 B2 | 4/2006 | Tabarovsky et al. | |
| 7,315,783 B2 * | 1/2008 | Lou | 702/18 |

(Continued)

FOREIGN PATENT DOCUMENTS

EP 1464991 A1 * 10/2004

(Continued)

OTHER PUBLICATIONS

Lou et al. Vector Kirchoff Migration of First ORder Downgoing Multiples from VSP Data. SEG. San Antonio 2007.*

(Continued)

*Primary Examiner*—Ian J Lobo
(74) *Attorney, Agent, or Firm*—Madan, Mossman & Sriram, P.C.

(57) ABSTRACT

$1^{st}$ order free-surface multiples recorded in VSP data or reverse VSP data are processed using a 3-C 3-D vector migration method to produce an image of the subsurface. This image produces a larger coverage than that obtained in 3-C 3-D processing of reflection data acquired in the VSP.

22 Claims, 12 Drawing Sheets

U.S. PATENT DOCUMENTS

2005/0090987 A1* 4/2005 Amundsen et al. ............ 702/14
2005/0135189 A1* 6/2005 Wang ........................... 367/50
2007/0162249 A1* 7/2007 Lou ............................. 702/147

FOREIGN PATENT DOCUMENTS

GB        2401177 A  * 11/2004

OTHER PUBLICATIONS

Chavarria et al. A Look Inside the San Andreas fault at Parkfield through Vertical Seismic Profiling. Science. 302, 1746 (2003).*

Hokstad, Ketil. Multicomponent Kirchoff Migration. Geophysics. vol. 65. No. 3. May-Jun. 2000.*

Jianhua Yu et al.; *Enhancing Illumination Coverage of VSP Data by Crosscorrelogram Migration*, SEG Int'l Exposition and 7th Annual Meeting, Denver, Colorado, Oct. 10-15, 2004, pp. 1-4, 7 Figs.

M. Lou; *Traveltime Calculation in 3D TTI Media by the Fast Marching Method*, H034, EAGE 6th Conference and Exhibition, Vienna, Austria, Jun. 12-15, 2006, pp. 1-5, 6 Figs.

Zhiyong Jiang et al.; *Migration of multiples*, The Leading Edge, Mar. 2005, pp. 315-318, 6Figs.

* cited by examiner

VECTOR MIGRATION OF 1ST ORDER FREE-SURFACE RELATED DOWNGOING MULTIPLES FROM VSP DATA

BACKGROUND OF THE INVENTION

1. Field of the Invention

This invention relates to a method of geophysical prospecting which improves the subsurface area imaged by Vertical Seismic Profiling (VSP) data. Specifically, the invention uses surface multiples, which have previously been regarded as noise, to provide a migrated image of a larger portion of the subsurface.

2. Description of the Related Art

In surface seismic exploration, energy imparted into the earth by a seismic source reflects and scatters from subsurface geophysical features and is recorded by a multiplicity of surface positioned receivers. This process is repeated numerous times, using source and receiver configurations which may either form a line (2-D acquisition) or cover an area (3-D acquisition). The acquired data are processed to produce an image of the reflectors in the subsurface using a procedure known as migration. The produced image is then used in prospect evaluation and development. Prospect evaluation and development specifically includes using the determined geometry of subsurface traps to establish the volume of recoverable reserves, and the drilling of additional exploration, evaluation and development wells based on the image.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver.

In vertical seismic profiling, seismic signals are recorded using detectors in a wellbore to record the energy generated by the activation of seismic sources at the surface. This results in the geometry such as that shown in FIG. 1 and is discussed further below. It is well recognized that traditional migration of upgoing primary reflections produces a VSP data image of only a very narrow conical zone around a borehole with the cone tip centered at the shallowest receiver in a borehole. This is schematically illustrated in FIG. 1 wherein exemplary reflected 129a, 129b and 129c are shown. To extend this limited imaging zone, Yu and Schuster (2004) used a cross-correlation method to migrate the free-surface related multiples, and showed an improved image coverage for a 2D VSP dataset. Jiang et. al. (2005) employed an interferometric imaging principle to migrate the multiples and obtained an extended image coverage comparable to a common depth point (CDP) image area obtained by a surface seismic survey. Both cross-correlation and interferometric imaging methods are less sensitive to near-surface static or velocity errors, which makes them attractive to migration of multiples in those VSP data sets with complex near-surface conditions or severe near-surface statics problems.

However, both cross-correlation and interferometric imaging methods just migrate a single scalar receiver component of the recorded data, although the VSP data is generally recorded using a three-component downhole receiver and the multiples recorded by borehole receivers have the nature of three-component (3C) vector wavefields. The migration of all the three components simultaneously instead of a single scalar component can enhance or improve the image quality of the multiple wave arrivals.

In addition, the cross-correlation and interferometric imaging method are expensive for migrating the multiples from a large 3D VSP data set, due to their extensive and intensive cross-correlation calculations involved in the migration.

SUMMARY OF THE INVENTION

One embodiment of the disclosure is a method of evaluating an earth formation. The method includes activating a seismic source at at least one source pulsation and generating seismic waves into the formation, receiving at least two components of seismic data at least one receiver position, a portion of the received seismic data resulting from reflection seismic waves at a free surface and interaction of the generated seismic waves with a portion of the earth formation, processing the at least two components of seismic data and producing an image of the earth formation, and conducting further operations based at least in part on the produced image. The at least one source position may include a plurality of source positions at or near the free surface. The at least one receiver position may include a plurality of positions in a borehole in the earth formation. Processing the at least two components of seismic data may further include building a mirror velocity model symmetric to the free surface using a subsurface velocity model, and projecting the at least one receiver position to a virtual position on the mirror velocity model. Processing the at least two components of seismic data may further include building a travel-time from the at least one source position to each of a plurality of image points and from the at least one virtual position to each of the plurality of image points, and migrating the at least two components of data to each of the plurality of image points using the travel-time table. Migrating the data may further include a Kirchhoff migration. The processing of the data may include a vector migration. Processing the data to may further include a wavefield separation. The subsurface velocity model may include at least one layer having transverse isotropy.

Another disclosed embodiment is a system configured for evaluating an earth formation. The system includes a seismic source configured to be activated at least one source position to generate seismic waves into the earth formation, a receiver at at least one receiver position configured to receive at least two components of seismic data, a portion of the received data resulting from a reflection of seismic waves at a free surface and interaction of the generated seismic waves with a portion of the earth formation. The system further includes a processor configured to process the received data and produce an image of the earth formation, the image serving as a basis for conducting further operations. The at least one source position may include a plurality of source positions at or near the free surface. The at least one receiver position may include a plurality of positions in a borehole in the earth formation. The processor may be further configured to process the data by further building a mirror velocity model symmetric to the free surface using a subsurface velocity model and projecting the at least one receiver position to a virtual position on the mirror velocity model. The processor is further configured to process the received seismic data by building a travel-time table from the at least one source position to each of a plurality of image points and from the at least one virtual position to each of the plurality of image points, and migrating the received data to each of the plurality of image points using the travel-time table. The processor may further be configured to migrate the seismic data by further performing a Kirchhoff migration. The processor may be configured to process the data by performing a vector migration. The processor may further be configured to process the data using a wavefield separation. The subsurface velocity model may further have a least one interval having transverse isotropy. The source may be an air gun, an explosive source or a vibratory source. The system may further include a conveyance device configured to convey the receiver into a borehole.

Another disclosed embodiment is a computer-readable medium for use with a system configured for evaluating an earth formation. The system includes a seismic source configured to be activated at least one source position to generate seismic waves into the earth formation and a receiver at at least one receiver position configured to receive at least two components of seismic data, a portion of the received seismic data resulting from a deflection of seismic waves at a free surface and interaction with the generated seismic waves with a portion of the earth formation. The medium includes instructions which enable a processor to process the seismic data and produce an image of the formation, the image serving as a basis for conducting further operations. The computer-readable medium may include a ROM, an EPROM, an EAROM, a Flash Memory, and/or an optical disk.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

The present disclosure is best understood by reference to the attached figures in which like numerals refer to like elements, and in which.

DETAILED DESCRIPTION

Figure 1:
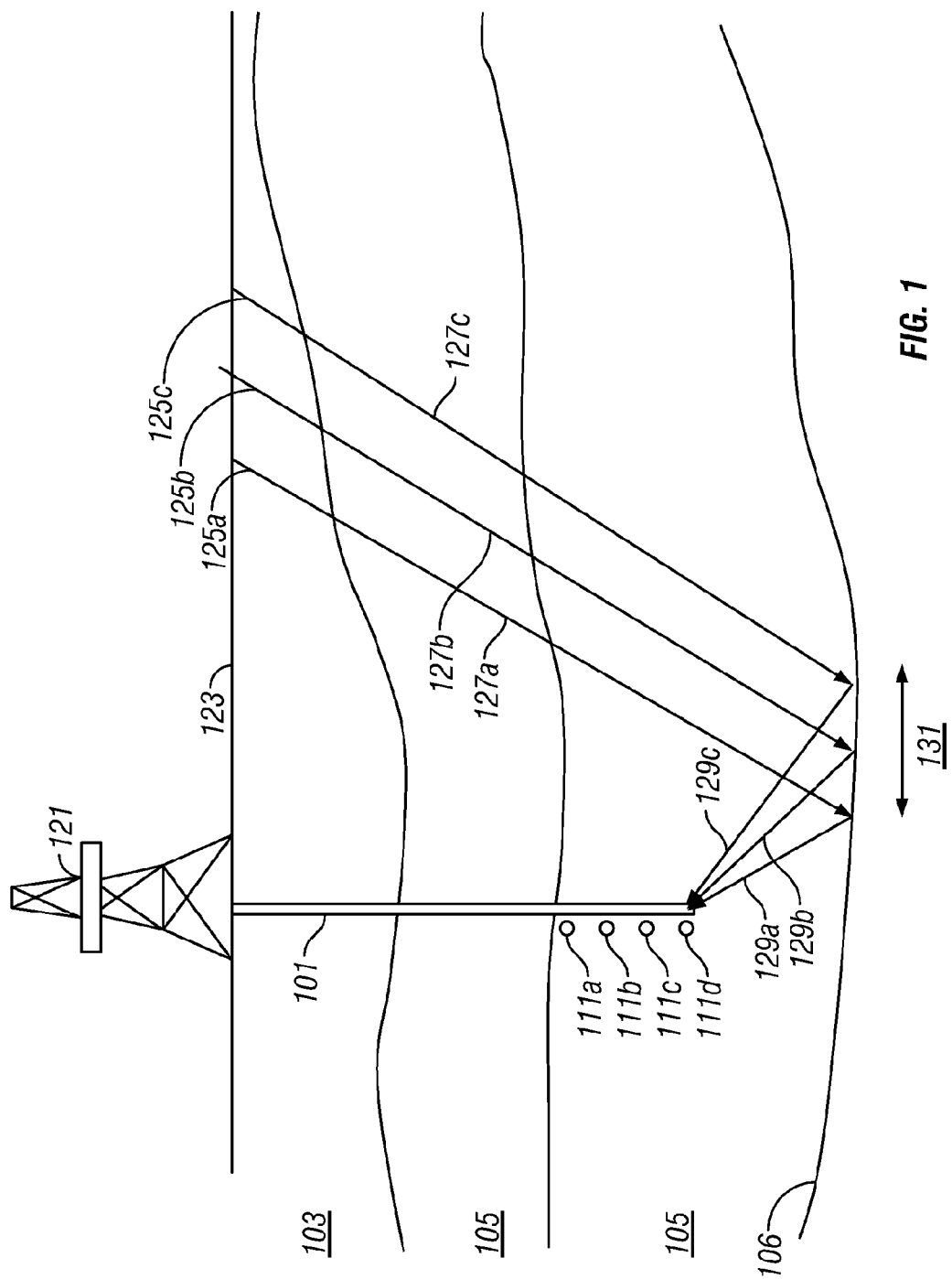
FIG. 1 illustrates the geometry of data acquisition of a walkaway VSP according to the present disclosure.

For the present disclosure, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. It could also be a borehole with permanently installed seismic sensors. The borehole 101 penetrates layers 103, 105. . . . Positioned in the borehole 101 are seismic sensors denoted by 111a, 111b, 111c. 111d. . . . Each of the sensors may include a hydrophone, a single-component geophone or a multi-component geophone. Data for a single offset VSP is typically acquired using a single seismic source such as 125a at the surface (or within a body of water at the surface). An exemplary raypath which depicts the propagation of seismic energy from the source 125a to a detector 111d is depicted by the ray 127a that is reflected from the bottom of layer 105 at the boundary 106 and reaches the receiver 111d along the raypath denoted by 129a. The seismic waves represented by the ray paths may be compressional waves and/or shear waves.

In a typical VSP, data resulting from operation of a source at a single position such as 125a are recorded in each of the receivers 111a, 111b, 111c, 111d . . . in the borehole. Analysis of the reflected data can provide information about the seismic velocities in the subsurface and the configuration of the layer boundaries. In a walkaway VSP, this process is repeated for operation of the source at a plurality of source positions such as 125b, 125c. . . . Acquisition of data from a plurality of source positions at a plurality of detectors provides a redundant sampling of the subsurface region. Commonly, a processor at a surface or at a remote location (not shown) is used to process the data. In offshore acquisition, and airgun is commonly used as a source. On land, explosive or vibratory sources may be used.

It is worth noting that with a VSP survey geometry shown in FIG. 1, the recorded signals are responsive primarily to reflectors below the recording array, and over a limited portion of the subsurface indicated generally by 131.

Figure 2:
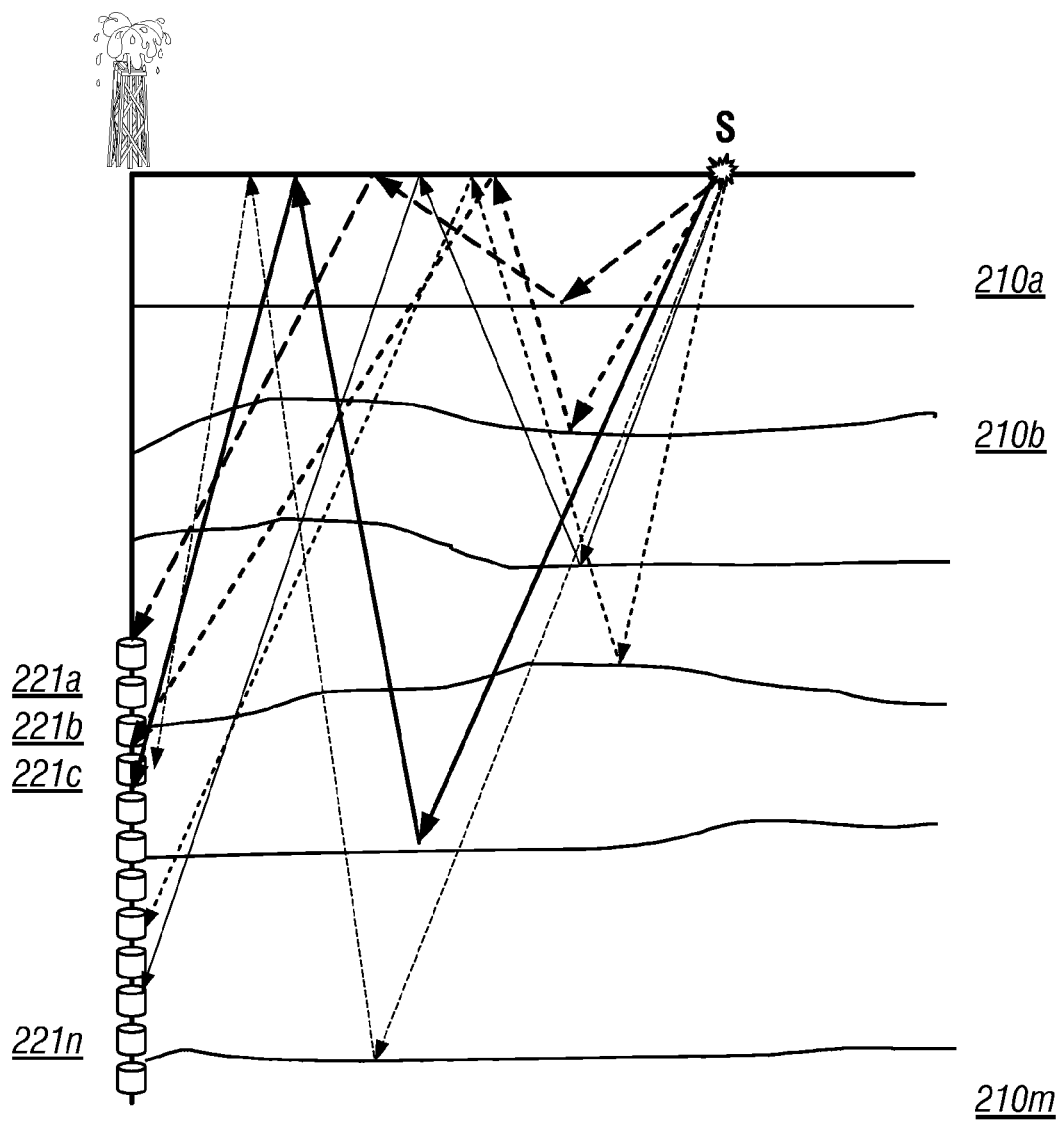
FIG. 2 is an illustration of first order free-surface downgoing multiples from an offset VSP survey.

The present disclosure uses, in addition to the reflected signals from below the recording array, $1^{st}$ order free-surface related multiples. The $1^{st}$ order free-surface related multiples are actually those upgoing primary reflections reflected once again from the free surface, and then propagating in a downward direction to the borehole receivers. FIG. 2 illustrates the ray paths of the $1^{st}$ order free-surface related multiples for a 2D geological model. Downgoing seismic waves excited by a point source (S) propagate onto different interfaces (201a, 201b . . . 201m) and then are reflected from the interfaces. These are called as primary reflections. Obviously, the borehole receivers (221a to 221n) can only receive the primary reflections coming from those interface sections below the receivers and at the same time very close to the borehole. In other word, the primary reflections received by the borehole geophones provide only a narrow illumination cone with the cone tip centered at the shallowest receiver in the borehole. However, most primary reflections will continuously propagate onto the free surface. The free surface may be the top of a body of water or it may be the land surface. The free surface acts as an almost perfect reflector (with a maximum 1.0 reflection coefficient), so the primary reflection onto the free surface will be strongly reflected back and propagate downward onto the borehole receivers 221a to 221n. The $1^{st}$ order multiples usually dominate in the downgoing wavefields of VSP data, because other higher order multiples will attenuate quickly due to their much longer travel distances relative to the $1^{st}$ order multiples. Compared with the primary reflections, the $1^{st}$ order free-surface related multiples have a significantly wider illumination zone which is almost equivalent to a common depth point (CDP) image area recorded using conventional surface seismic survey techniques.

Figure 3:
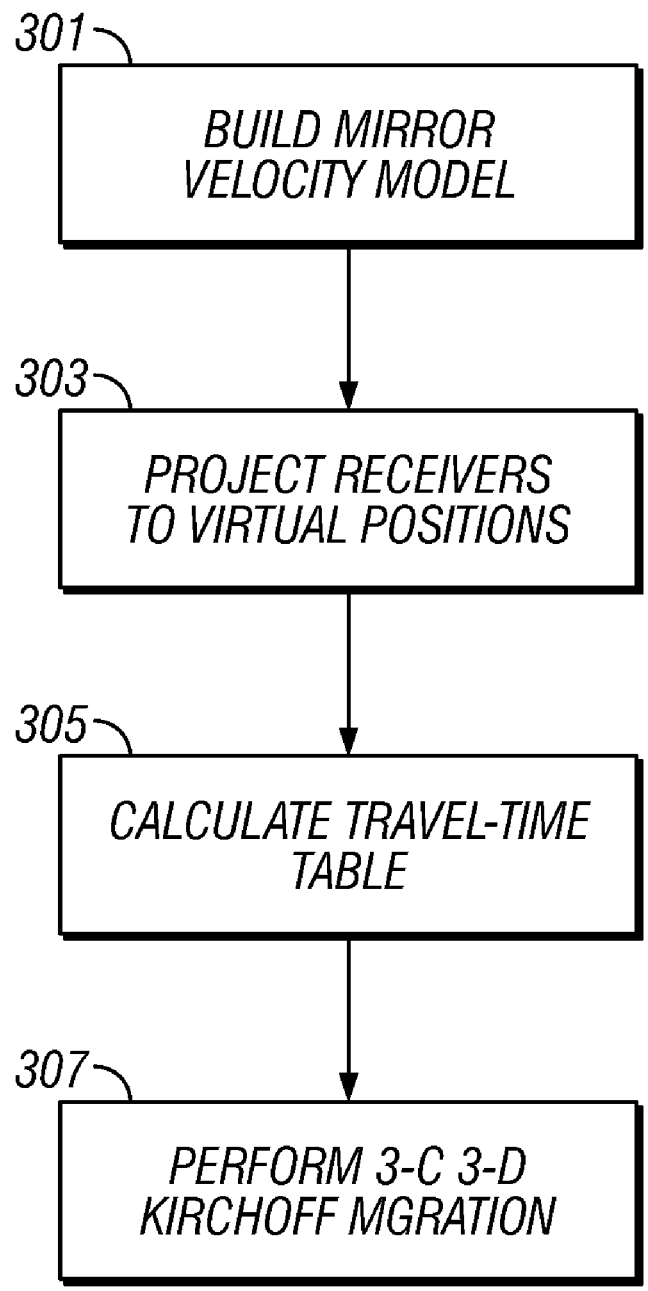
FIG. 3 is a flow chart of some steps of the method of the present disclosure.
Figure 4:
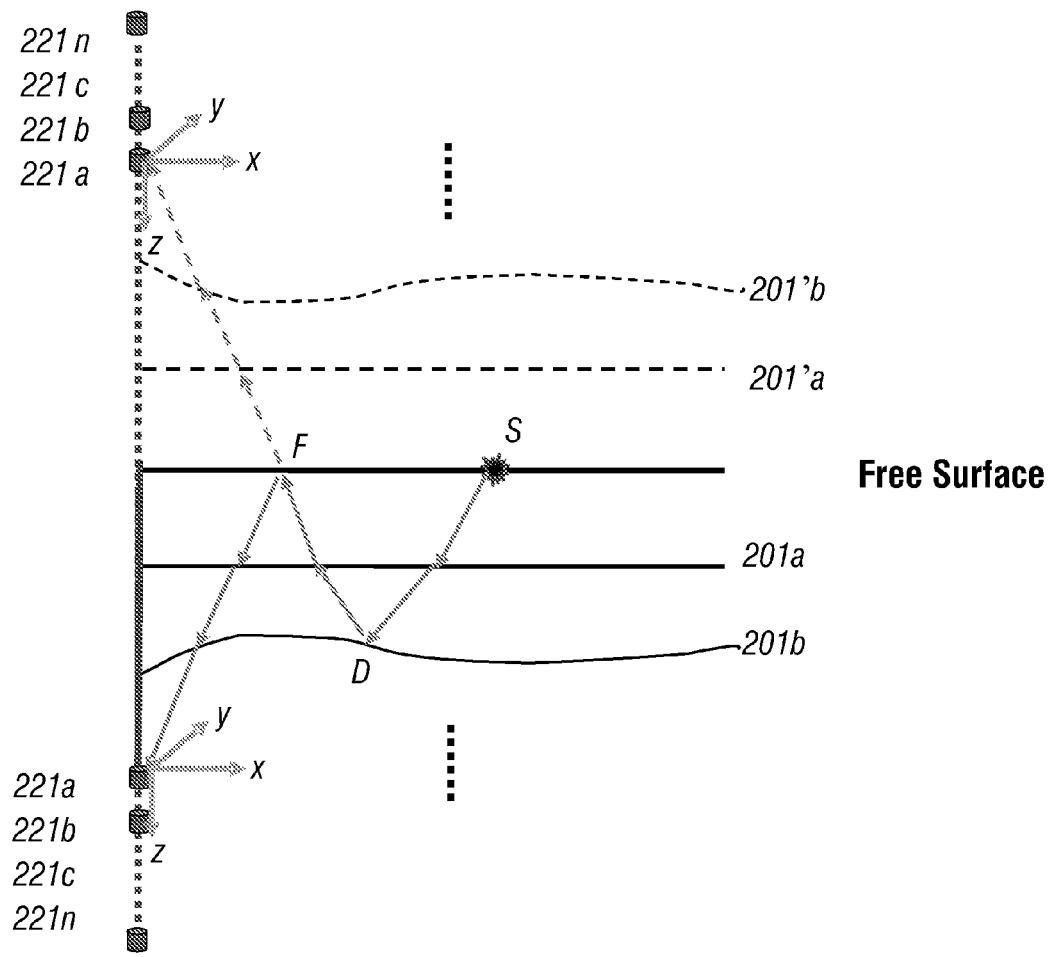
FIG. 4 illustrates the concept of the free surface symmetric imaging principle in vector summation for migration of the $1^{st}$ order free-surface multiples VSP data.

Turning now to FIG. 3, a flow chart of some of the steps of the present disclosure is illustrated. We build a mirror-image velocity model 301 symmetric to the free surface. We vertically up-extend a subsurface velocity model beyond the free surface to a distance equal to the deepest receiver depth in a VSP survey, so that the extended velocity is symmetric to the free surface. FIG. 4 illustrates the extended velocity model at which virtual layer interfaces (201'b, 201'a . . . ) are symmetric about the free surface with their true interfaces (201a, 201b . . . ). [Note: If the velocity model is transverse isotropic (TTI) with a tilted angle θ, then the tilted angle for the extended velocity above the free surface should be −θ, due to the mirror symmetry for wave propagation]. The subsurface model may be obtained using known methods in the art.

We next project the receivers to their virtual position 303. We project the true positions of borehole receivers (221a, 221b, 221c . . . 221n) into their virtual positions (221'a, 221'b, 221'c . . . 221'n) on the mirror velocity model, so that the true receiver positions and their virtual receiver positions are symmetric about the free surface. The combination of steps 1 and 2 is also called as the symmetric imaging principle for the $1^{st}$ order free-surface related multiples. Based on the symmetric imaging principle, we can treat all $1^{st}$ order free-surface multiples recorded by borehole receivers 221a-221n as primary reflections recorded by virtual borehole receivers 221'a-221'n. That is, as FIG. 4 illustrates, the ray path SDF221a of a multiple received by 221a is equivalent to the ray path SDF221'a of a primary reflection received by 221'a. The major advantage of treating the $1^{st}$ order multiples as primary reflections is that we can make use of almost all existing migration algorithms developed for primary reflections to migrate the $1^{st}$ order multiples accurately and efficiently.

We next build travel-time tables for the model 305. This involves calculating and building travel time tables from every source position to each possible image point in the velocity model and from each virtual receiver position to each image point in the mirror velocity model. There are a number of techniques/methods available to calculate the travel times. In this disclosure, we use a fast marching method developed for 3D TTI media (Lou, 2006) to calculate the travel times accurately and efficiently.

Next, a 3-C Kirchhoff migration of the 3-D data set is performed 307 using the generated travel times. The basic principles of 3-C 3-D migration having discussed in U.S. patent application Ser. No. 10/972,880 of Wang having the same assignee as the present disclosure and the contents of which are incorporated herein by reference. One point of difference from the teachings of Wang is that, in the present disclosure, travel-times from the source to each of a plurality of image points and from each of the plurality of image points to each of the virtual receivers is used. In contrast, in Wang, travel times to actual receiver points are used.

Based on the travel time tables built at 305, we can write the three-component vector summation of 3D Kirchhoff prestack depth migration for the $1^{st}$ order multiples as:

$$M(i, j, k) = \sum_s \sum_{g'} W(i, j, k, s, g')[r_x(i, j, k, g')A_x(t_s(i, j, k) + t_{g'}(i, j, k)) + \\ r_y(i, j, k, g')A_y(t_s(i, j, k) + t_{g'}(i, j, k)) + \\ r_z(i, j, k, g')A_z(t_s(i, j, k) + t_{g'}(i, j, k))]$$ (1)

where M(i, j, k) is the migration result for each image grid (i, j, k) point on a three-dimensional grid, W(i, j, k, s, g') is a weight factor varying with positions of the image point, the source s and the virtual receiver g', $[r_x(i, j, k, g'), r_y(i, j, k, g'), r_z(i, j, k, g')]$ are x, y, and z components of a unit ray vector of the multiples from the image point (i, j, k) to the virtual receiver g', $t_s(i, j, k)$ is the travel time from the source s to the image point (i, j, k), $t_{g'}(i, j, k)$ is the travel time from the image point (i, j, k) to the virtual receiver g', and $[A_x(t_s(i, j, k)+t_{g'}(i, j, k)), A_y(t_s(i, j, k)+t_{g'}(i, j, k)), A_z(t_s(i, j, k)+t_{g'}(i, j, k))]$ are three vector component (x, y, z) amplitudes of the receiver g' at travel time $t_s(i, j, k)+t_{g'}(i, j, k)$.

We next show an illustrative example of the advantage of using the method of the present disclosure. The methodology was first tested using a full-elastic finite difference (FD) modeling data set produced from a 2D layered model with a walkaway VSP survey geometry shown as in FIG. 5. The model has seven layer interfaces contrasted by different P-wave velocities. The VSP survey has a total of 41 sources starting from x 1050 ft (320 m) to 9050 ft (2758 m) with a 200 ft (61 m) station interval. The depth of all sources is 10 ft (3 m) below the free surface. There are 30 three-component borehole receivers positioned from a vertical depth 4550 ft (1387 m) to 6000 ft (1829 m) with 50 ft (15 m) interval. The top of the borehole is at x=5000 ft (1524 m).

Figure 6:
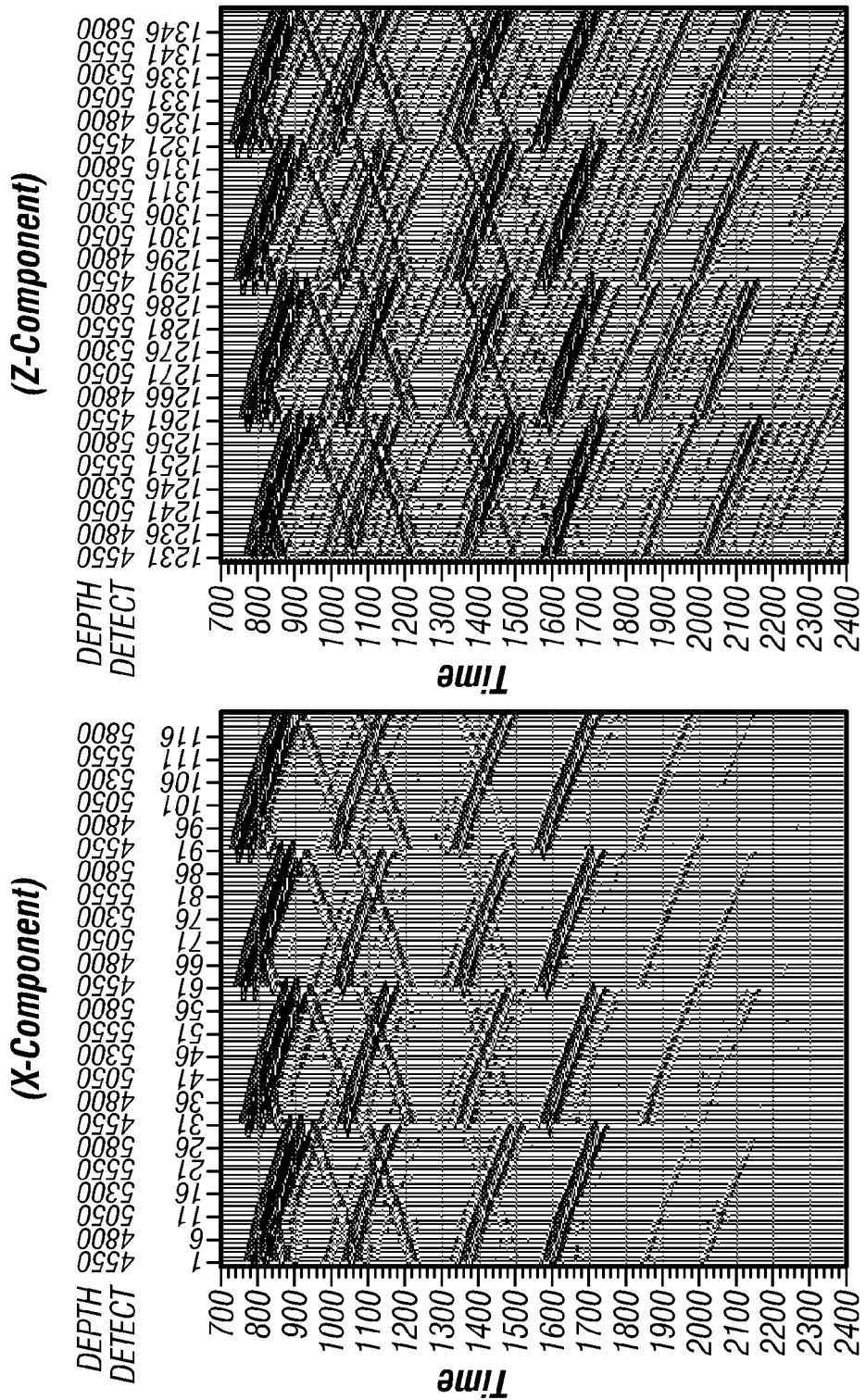
FIG. 6 shows four selected common-shot gathers for the FD model of FIG. 5.

FIG. 6 shows four selected common shot gathers (x=1050 ft (320 m), 1250 ft (381 m), 1450 ft (442 m) and 1650 ft (503 m) of the FD modeled data. The left side of the figure shows the x-(horizontal inline) component signals and a right side of the figure shows the z-(vertical) component of the signals. All the downgoing and upgoing wavefields (or total wavefield) are strongly presented on both x- and z-components, while the horizontal transverse (y-) component has zero P-wave amplitude for the 2D modeling.

Figure 7:
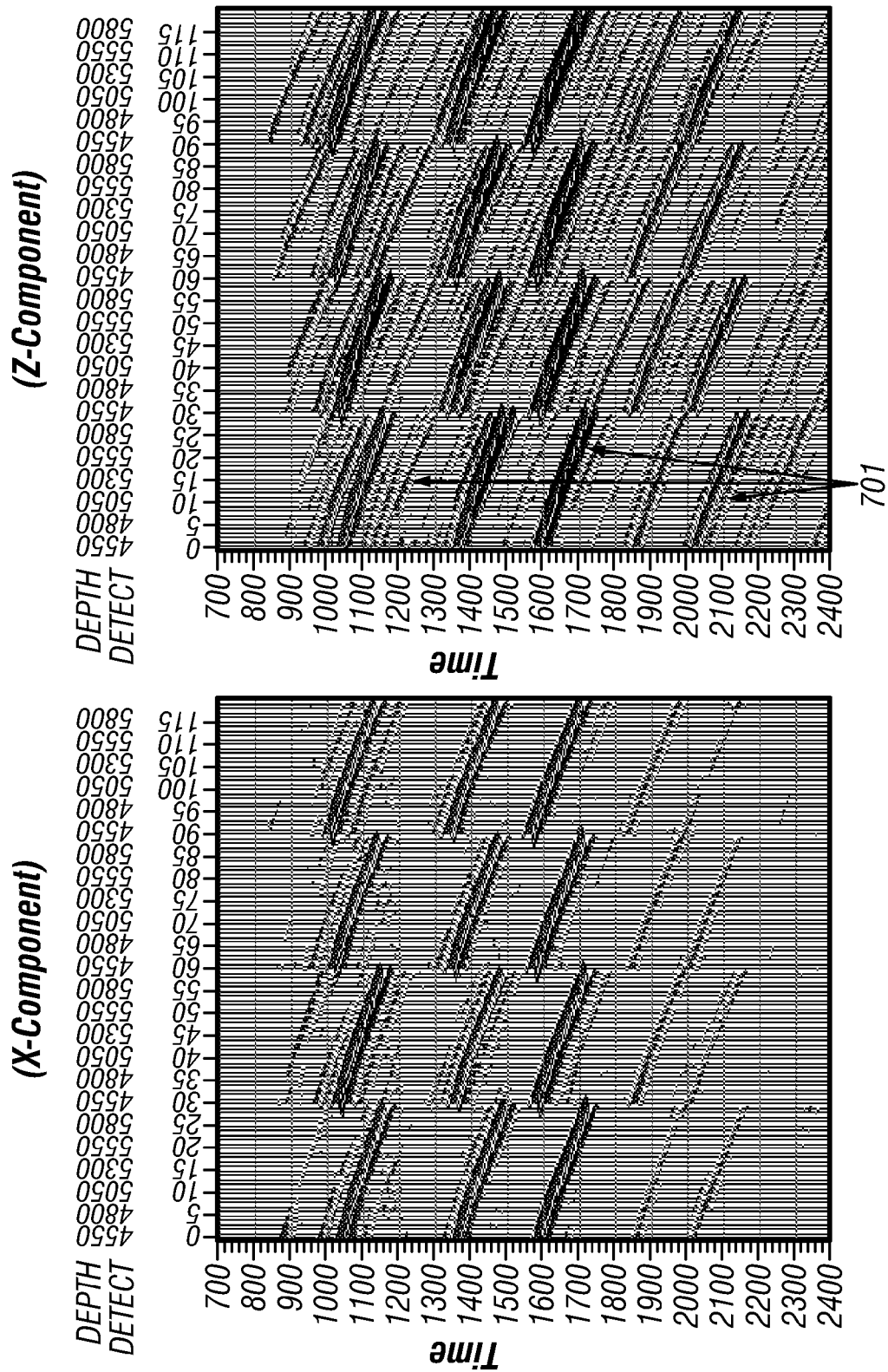
FIG. 7 shows four selected downgoing wave-field gathers separated from the total wavefield of FIG. 6.

The results of separating the upgoing and downgoing wave fields is seen next. We separated the total wavefield data as the downgoing wavefields (FIG. 7) and the upgoing wavefields (FIG. 8), respectively, by using a median filter. Note that some numerical noise and other possible PS converted wave modes etc. were also generated by the FD elastic modeling, as marked in FIG. 7.

Figure 8:
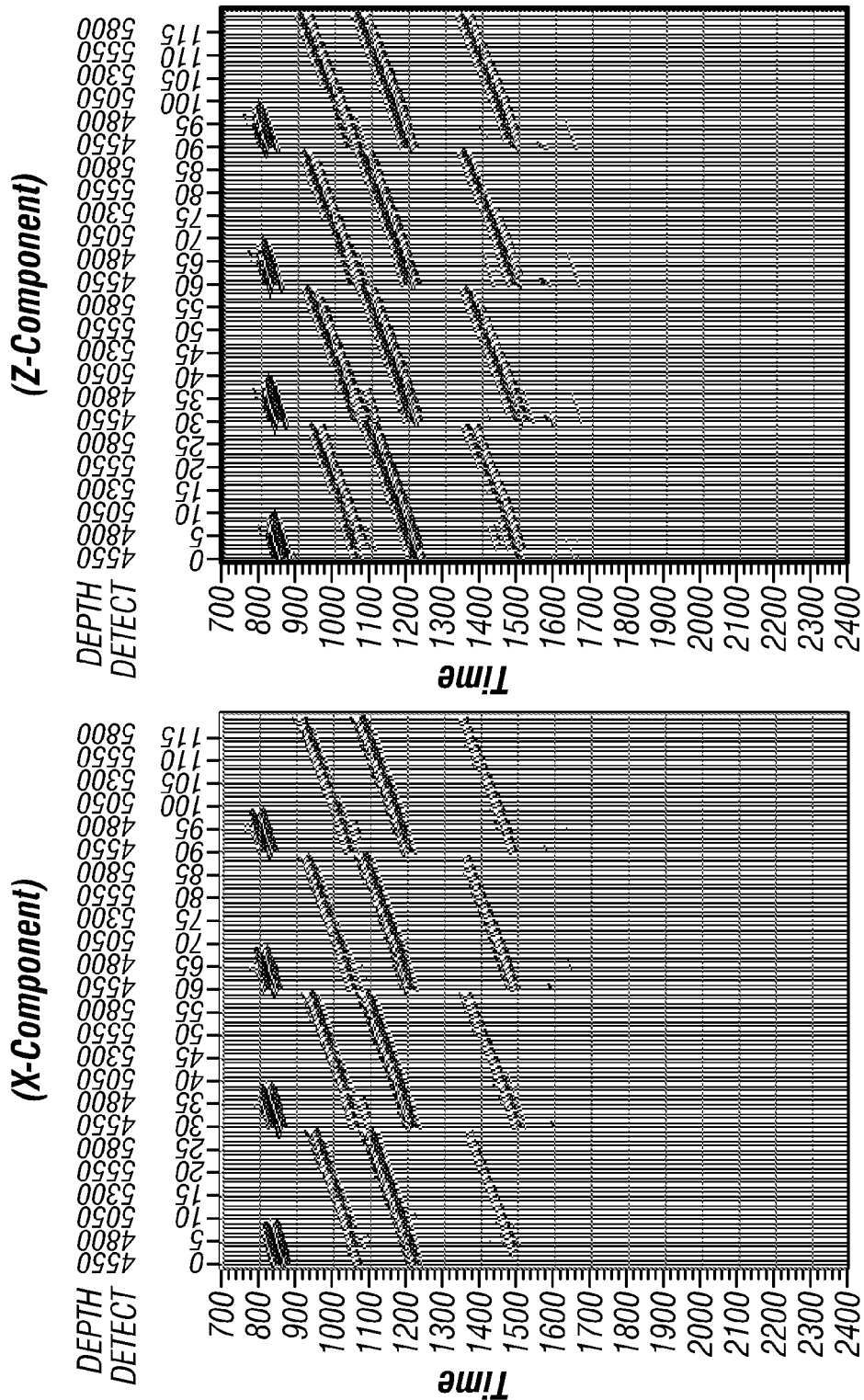
FIG. 8 shows four selected upgoing wave-field gathers separated from the total wavefield of FIG. 6.
Figure 9:
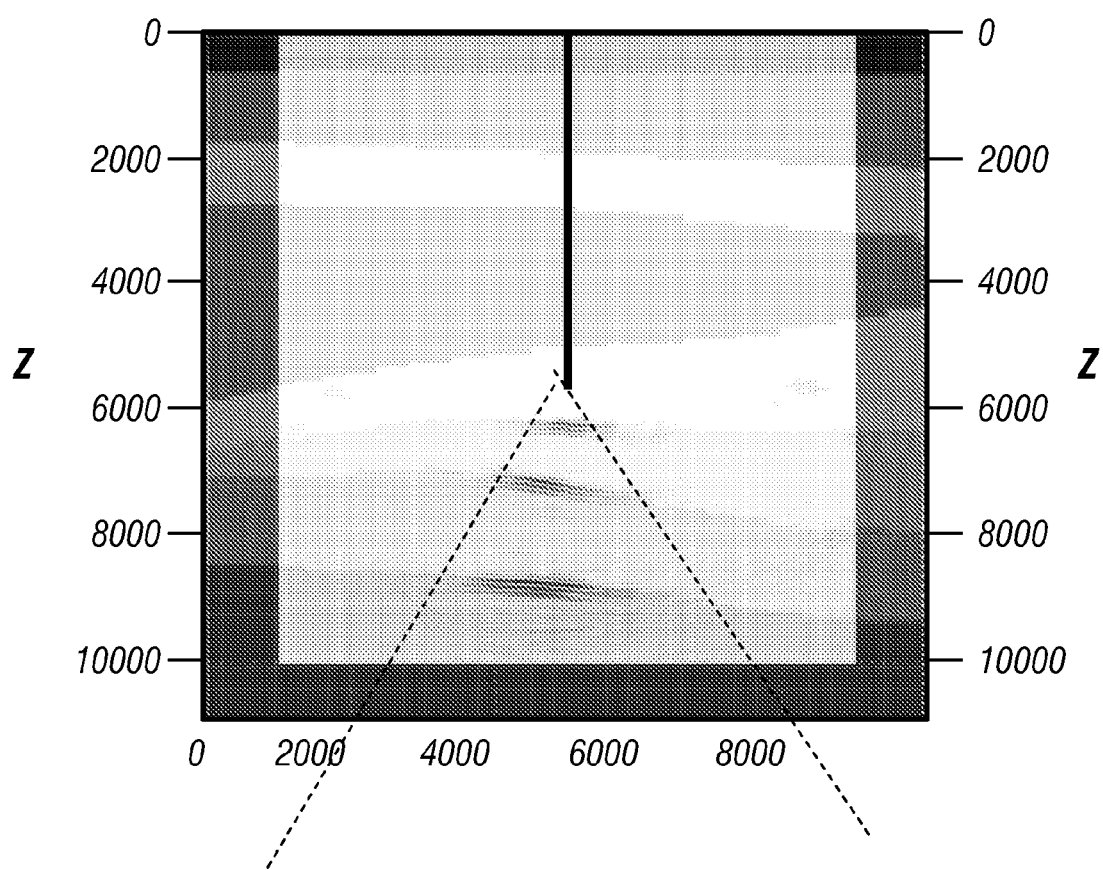
FIG. 9 shows the result of vector migration of the upgoing reflections.
Figure 10:
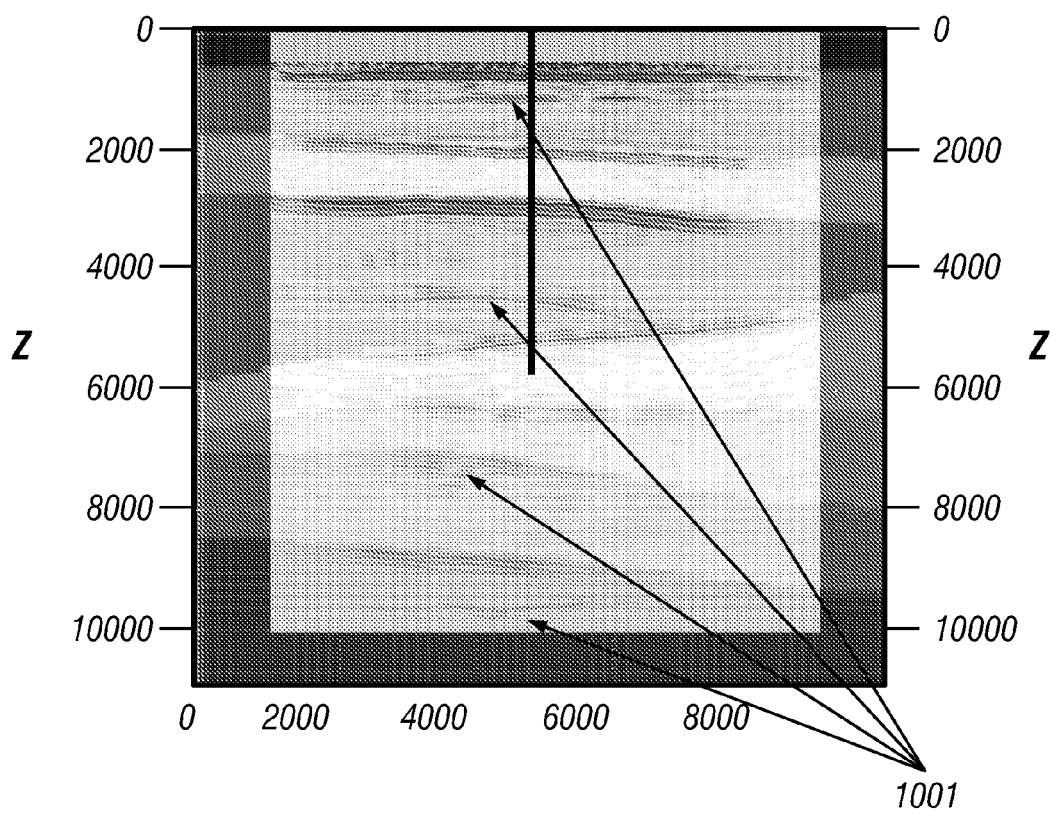
FIG. 10 shows the result of vector migration of the downgoing multiples.

FIG. 9 displays the result of using the vector migration method discussed above for the upgoing wavefield (sample gathers shown in FIG. 8). This is an approximation of what would be expected with 3-C 3-D processing of reflection data only, with surface multiples eliminated. It should be noted that removal of surface multiples as "undesirable noise" is part of normal seismic data processing. As might be expected, the image zone shown in FIG. 9 is limited to a narrow cone around the borehole with its tip at the shallowest borehole receiver, although the small sections of the three interfaces below the borehole were correctly imaged. The approximate boundaries of the cone are shown by the dotted lines in FIG. 9. FIG. 10 shows the image result of the downgoing multiple wavefields (from FIG. 7) which were migrated as the $1^{st}$ order free-surface related multiples. Comparing with the migration result of upgoing reflection wavefields of FIG. 9, the imaged zone of the downgoing multiples has been widely extended above and beyond the borehole receivers. Large parts of all the seven interfaces in the model were correctly imaged in FIG. 10. The migration result of FIG. 10 also suggests that the $1^{st}$ order free-surface related multiples are usually the dominant signals in the downgoing wavefields. As for those migration artifacts marked as 1001 in FIG. 10, they are caused by the numerical noise and other possible PS converted wave modes etc. presented in the FD modeling data (see 701 in FIG. 7).

Figure 11:
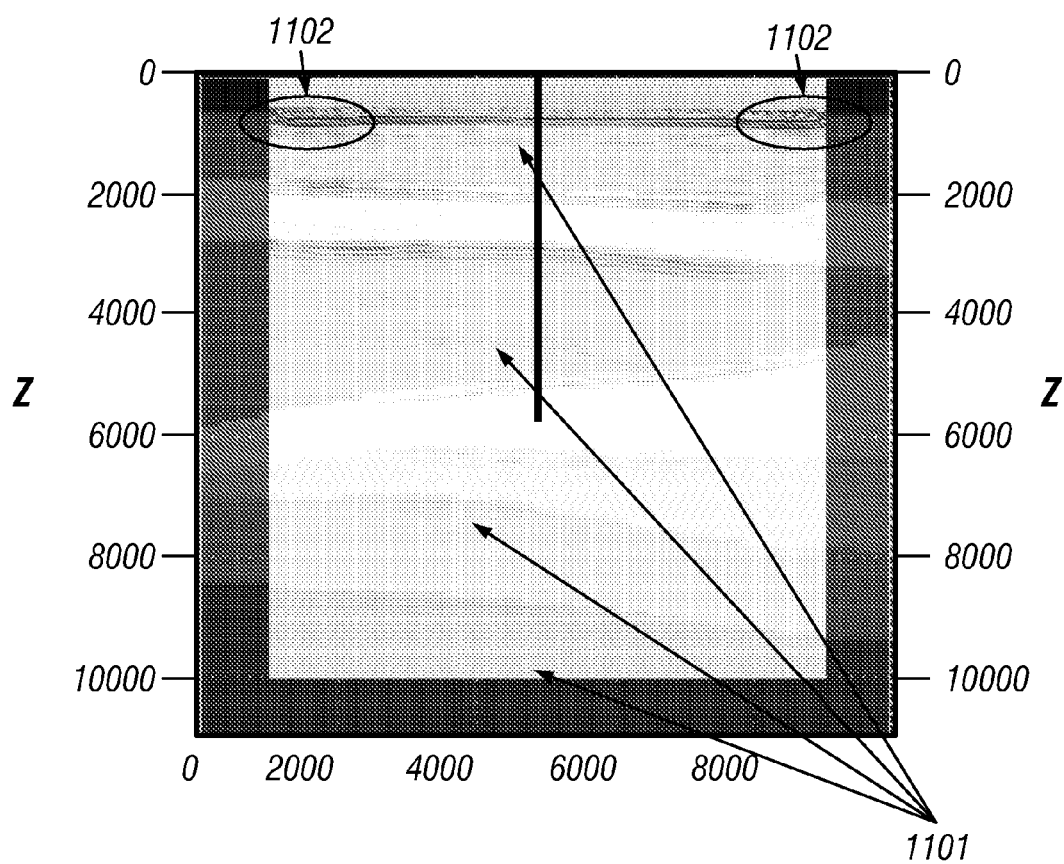
FIG. 11 shows the result of a single (z-) component migration of the downgoing multiples.

FIG. 11 shows a single scalar component (z) migration result for the downgoing multiple wavefields. Comparing with the vector migration result of FIG. 10, it is seen that the imaging strength/quality of the single scalar component migration is significantly degraded relative to the multi-component vector migration. We note that corresponding to the events 1001 in FIG. 10, the corresponding portion 1101 of FIG. 11 shows little signal strength. This is an indication that the events 1001 are most likely PS events since they are weakly recorded on the vertical component of FIG. 11. The edge artifacts of migration (outlined by two ovals 1102 in FIG. 11) also become more obvious with the single scalar component migration. It should be noted that the same fixed amplitude scale was used to display both FIG. 10 and FIG. 11, so that their amplitude or signal strength is comparable.

Figure 5:
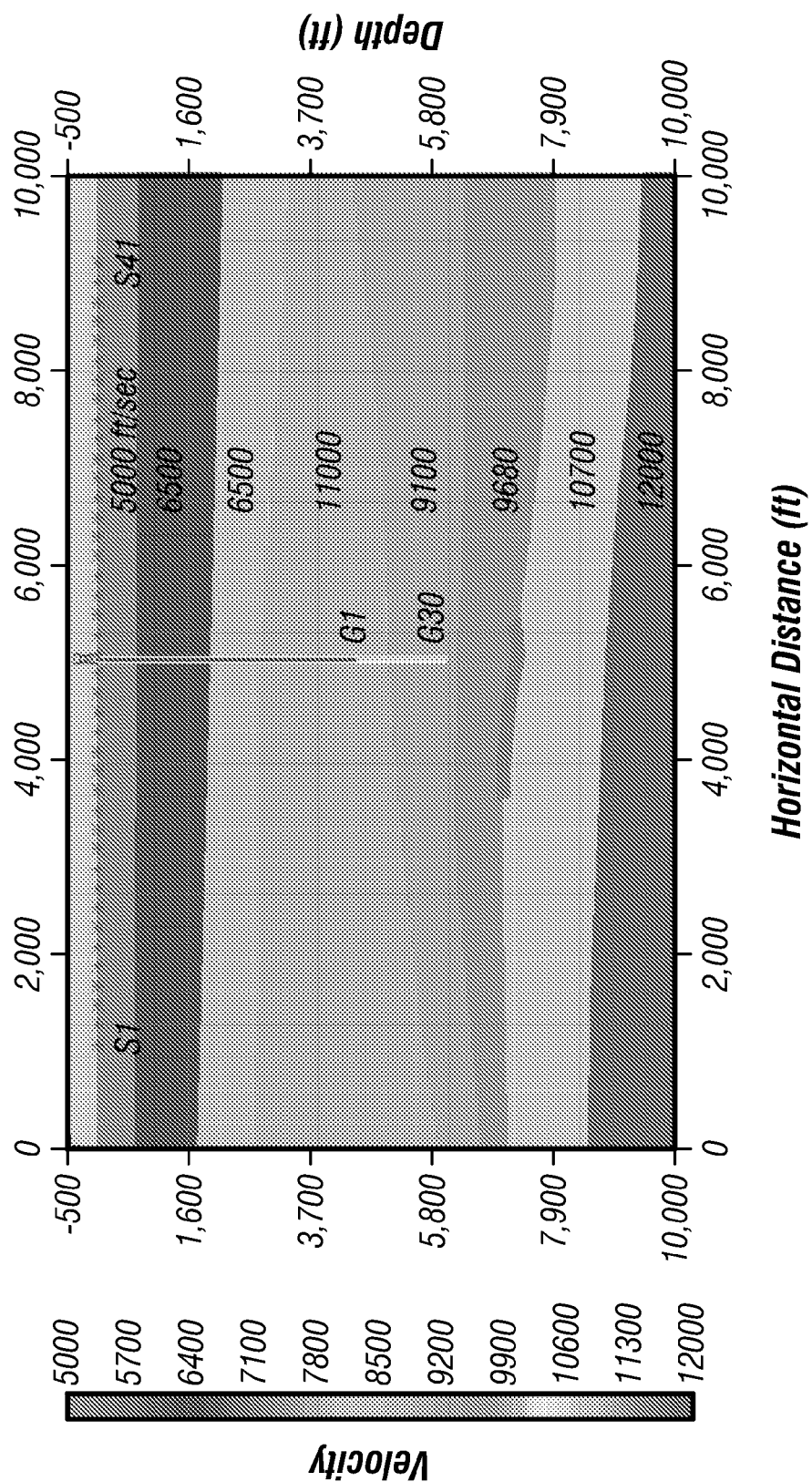
FIG. 5 shows a 2-D geologic model used in an elastic finite difference (FD) modeling simulation.

Comparing the model of FIG. 5 with the migrated output of the method of the present disclosure shown in FIG. 10, it can be seen that the method of the present invention properly reconstructs the velocity boundaries in the model. The method of the present disclosure can thus be used on 3-component field data to produce an image of the subsurface. The method can be used for 3-component acquired data processed as a single scalar component, as two components or as three components. The processed data resulting from the processing described above may be displayed and/or stored on a suitable medium. As noted above, the produced image may be used for further operations in prospect evaluation and development. This specifically includes using the determined geometry of subsurface reservoirs to establish the volume of recoverable reserves, and the drilling of additional exploration, evaluation and development wells based on the image.

The method of the present disclosure has been described above in terms of VSP geometry in which sources are at the surface and a receiver may be at a downhole location. The method may also be practiced, based on the principle of reciprocity, by having a downhole seismic source and surface receivers. For such a reverse VSP geometry, the free surface reflection would occur before the reflection at the subsurface layer, and instead of a virtual receiver, the method would be based on constructing a virtual source. The mirror velocity model would not be changed. For both VSP and reverse VSP data, the received signals are a result of a surface reflection and interaction of seismic waves with the subsurface.

Figure 12:
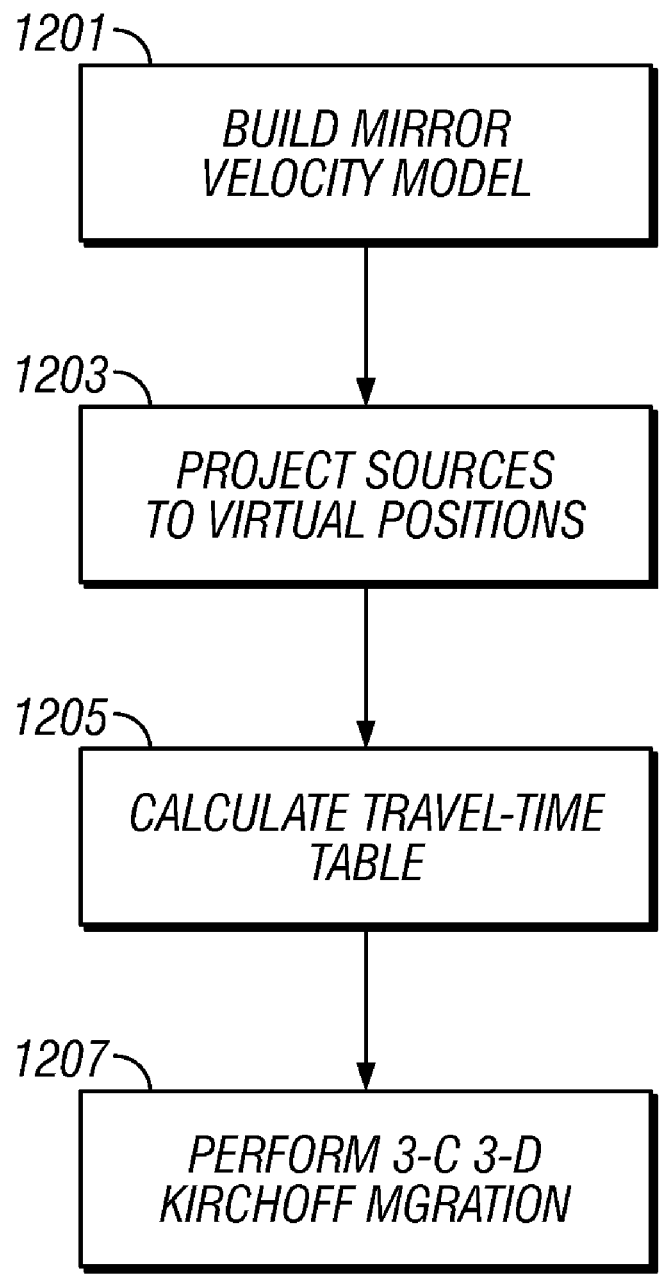
FIG. 12 is a flow chart of some of the steps of an alternate embodiment.

This embodiment is discussed with reference to FIG. 12. As before, we build a mirror-image velocity model 1201 symmetric to the free surface. We vertically up-extend a subsurface velocity model beyond the free surface to a distance equal to the deepest receiver depth in a VSP survey, so that the extended velocity is symmetric to the free surface. We next project the sources to their virtual position 1203. We project the true positions of borehole sources into their virtual positions on the mirror velocity model, so that the true source positions and their virtual source positions are symmetric about the free surface. The combination of steps 1 and 2 is also called as the symmetric imaging principle for the $1^{st}$ order free-surface related multiples. We next build travel-time tables for the model 1205. This involves calculating and building travel time tables from every virtual source position to each possible image point in the velocity model and from each receiver position to each image point in the mirror velocity model. Next, a 3-C Kirchhoff migration of the 3-D data set is performed 1207 using the generated travel times.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of evaluating an earth formation, the method comprising:
   activating a seismic source at at least one source position and generating seismic waves into the earth formation;
   receiving at least two components of seismic data at at least one receiver position, a portion of the received seismic data resulting from (I) a reflection of seismic waves at a free surface, and (II) an interaction of seismic waves with a portion of the earth formation;
   processing the at least two components of seismic data including said portion resulting from said reflection and producing a migrated image of the earth formation; and
   conducting further operations based at least in part on the produced image; wherein processing the received at least two components of seismic data further comprises:
   building a mirror velocity model symmetric to the free surface using a subsurface velocity model, and
   projecting the at least one receiver position to a virtual position on the mirror velocity model.

2. The method of claim 1 wherein the at least one source position further comprises a plurality of source positions at or near the free surface.

3. The method of claim 1 wherein the at least one receiver position further comprises a plurality of positions in a borehole in the earth formation.

4. The method of claim 1 wherein processing the received at least two components of seismic data further comprises:
   (A) building a travel-time table from:
      (I) the at least one source position to each of a plurality of image points, and
      (II) the at least one virtual position to each of the plurality of image points; and
   (B) migrating the received at least two components of data to each of the plurality of image points using the travel-time table.

5. The method of claim 1 wherein producing the migrated image further comprises a vector migration.

6. The method of claim 1 wherein processing the received at least two components of data further comprises of a wavefield separation into downgoing and upgoing wavefields.

7. The method of claim 1 wherein the further operations include at least one of:
   (i) storing the processed at least two components of data on a suitable medium,
   (ii) storing the image on a suitable medium,
   (iii) displaying the image,
   (iv) performing additional prospect evaluation,
   (v) establishing a volume of recoverable reserves,
   (vi) drilling an additional expiration well,
   (vii) drilling an additional evaluation well, and
   (viii) drilling in additional development well.

8. The method of claim 1 wherein the at least one source position further comprises a plurality of source positions in a borehole in the earth formation.

9. The method of claim 1 wherein the at least one receiver position further comprises a plurality of positions at or near the free surface.

10. The method of claim 1 wherein the portion of the received data resulting from the reflection of seismic waves at the free surface further comprises a downgoing wave.

11. A system configured for evaluating an earth formation, the system comprising:
    a seismic source configured to be activated at at least one source position to generate seismic waves into the earth formation;
    a receiver at at least one receiver position configured to receive at least two components of seismic data, a portion of the received seismic data resulting from: (I) a reflection of seismic waves at a free surface, and (II) an interaction of seismic waves with a portion of the earth formation; and
    a processor configured to:
        build a mirror velocity model symmetric to the free surface using a subsurface velocity model;
        project the at least one receiver position to a virtual position on the mirror velocity model; and
        process the received at least two components of seismic data including said portion using the mirror velocity model and the virtual position of the at least one receiver to produce a migrated image of the earth formation, the image serving as a basis for conducting further operations.

12. The system of claim 11 wherein the at least one source position further comprises a plurality of source positions at or near the free surface.

13. The system of claim 11 wherein the at least one receiver position further comprises a plurality of positions in a borehole in the earth formation.

14. The system of claim 13 further comprising a conveyance device configured to convey the receiver into the borehole.

15. The system of claim 11 wherein the processor is further configured to process the received at least two components of seismic data by further:
    (A) building a travel-time table from:
        (I) the at least one source position to each of a plurality of image points, and
        (II) the at least one virtual position to each of the plurality of image points; and
    (B) migrating the received at least two components of data to each of the. plurality of image points using the travel-time table.

16. The system of claim 11 wherein the processor is further configured to produce the migrated image by further performing a vector migration.

17. The system of claim 11 wherein the further operations include at least one of:
    (i) storing the processed at least two components of data on a suitable medium,
    (ii) storing the image on a suitable medium,
    (iii) displaying the image,
    (iv) performing additional prospect evaluation,
    (v) establishing a volume of recoverable reserves,
    (vi) drilling an additional exploration well,
    (vii) drilling an additional evaluation well, and
    (viii) drilling in additional development well.

18. The system of claim 11 wherein the source is selected from the group consisting of: (i) an airgun, (ii) an explosive source, and (iii) a vibratory source.

19. The system of claim 11 wherein the at least one source position further comprises a plurality of source positions in a borehole in the earth formation.

20. The system of claim 11 wherein the at least one receiver position further comprises a plurality of positions at or near the free surface.

21. The system of claim 11 wherein the portion of the received data resulting from the reflection of seismic waves at the free surface further comprises a downgoing wave.

22. A computer-readable medium for use with a system configured for evaluating an earth formation, the system comprising:
    (a) a seismic source configured to be activated at at least one source position to generate seismic waves into the earth formation;
    (b) a receiver at at least one receiver position configured to receive at least two components of seismic data, a portion of the received seismic data resulting from: (I) a reflection of seismic waves at a free surface, and (II) an interaction of seismic waves with a portion of the earth formation; the medium including instructions which enable a processor to:
    (c) build a mirror velocity model symmetric to the free surface using a subsurface velocity model;
        project the at least one receiver position to a virtual position on the mirror velocity model; and
        process the received at least two components of seismic data including said portion using the mirror velocity model and the virtual position of the at least one receiver to produce a migrated image of the earth formation, the image serving as a basis for conducting further operations.

* * * * *